(12) United States Patent  
Wang et al.

(10) Patent No.: US 6,742,693 B2
(45) Date of Patent: Jun. 1, 2004

(54) SOLDER BATH WITH ROTATABLE NOZZLE

(75) Inventors: Po-Hung Wang, Taipei Hsien (TW); Chun-Hsiung Chiu, Taoyuan Hsien (TW); Peng-Wei Wang, Kaohsiung (TW); Jung-I Ku, Taipei Hsien (TW); Chia-Hao Wu, Taipei (TW)

(73) Assignee: Asustek Computer, Inc., Taipei (TW)

( * ) Notice: Subject to any disclaimer, the term of this patent is extended or adjusted under 35 U.S.C. 154(b) by 115 days.

(21) Appl. No.: 10/228,186

(22) Filed: Aug. 27, 2002

(65) Prior Publication Data

US 2003/0116606 A1 Jun. 26, 2003

(30) Foreign Application Priority Data

Dec. 21, 2001 (TW) ........................................ 90222523 U
Dec. 21, 2001 (TW) ........................................ 90222524 U
Dec. 21, 2001 (TW) ........................................ 90222525 U

(51) Int. Cl.⁷ ............................. B23K 31/02; B23K 3/06
(52) U.S. Cl. ......................... 228/37; 228/56.1; 228/260
(58) Field of Search .......................... 228/33, 37, 56.1, 228/256, 260

(56) References Cited

U.S. PATENT DOCUMENTS

| 4,659,003 | A | * | 4/1987 | Simonetti | 228/8 |
| 4,685,605 | A | * | 8/1987 | Spigarelli et al. | 228/37 |
| 4,697,730 | A | * | 10/1987 | Spigarelli et al. | 228/37 |
| 4,796,796 | A | * | 1/1989 | Habraken | 228/37 |
| 4,824,010 | A | * | 4/1989 | Inoue et al. | 228/180.21 |
| 4,848,640 | A | * | 7/1989 | Gieskes | 228/37 |
| 4,848,642 | A | * | 7/1989 | Kondo | 28/37 |
| 4,886,201 | A | * | 12/1989 | Deambrosio et al. | 228/37 |
| 4,981,249 | A | * | 1/1991 | Kawashima et al. | 228/37 |
| 5,388,752 | A | * | 2/1995 | Kawakatsu | 228/20.1 |
| 6,138,890 | A | * | 10/2000 | Kanno et al. | 228/37 |
| 6,431,431 | B2 | * | 8/2002 | Willis et al. | 228/37 |
| 6,478,215 | B2 | * | 11/2002 | Zen | 228/260 |
| 2003/0116606 | A1 | * | 6/2003 | Wang et al. | 228/32 |
| 2003/0116607 | A1 | * | 6/2003 | Wang et al. | 228/37 |

FOREIGN PATENT DOCUMENTS

| EP | 0278166 A2 | * | 8/1988 |
| JP | 363043759 A | * | 2/1988 |
| JP | 363043760 A | * | 2/1988 |
| JP | 402025274 A | * | 1/1990 |
| TW | 321022 | | 1/1986 |
| TW | 505073 | | 7/2002 |

* cited by examiner

Primary Examiner—Kiley Stoner
(74) Attorney, Agent, or Firm—Birch, Stewart, Kolasch & Birch LLP

(57) ABSTRACT

A new solder bath apparatus applied to the soldering furnace is disclosed herein. The solder bath is used for containing molten solder. And a nozzle base is located in the solder bath to flow molten solder upwards. An enclosing frame with axial horizontal pillars mounted on the two terminal sidewalls thereof is put around the nozzle base. Besides, a nozzle manufactured with two bearing pedestals on two terminal sidewalls responsive to the pillars is put around the enclosing frame. Thus, the nozzle can rotate about the axial pillars for adjusting the outlet direction thereof.

16 Claims, 4 Drawing Sheets

SOLDER BATH WITH ROTATABLE NOZZLE

FIELD OF THE INVENTION

The present invention relates to a new solder bath apparatus of soldering furnace, and more specifically, to a solder bath with a rotatable nozzle for adjusting flow of gushing molten solder.

BACKGROUND OF THE INVENTION

With the continuing advances and developments of electrical manufactures, the electrical products in new generation have more developed and complicated capability to provide peoples more convenient and comfortable life. For instance, in computer industry, because the manufacture and packaging techniques of integrated circuits are promoted and matured, the high quality multimedia personal computers are widely used. The expenditure enhancement for computers and peripheral products cause the popularization and more vigorous development thereof. However, when the performances of chips are promoted, the amounts of leads to package components on the printed circuit boards (PCBs) also are continuously enhanced. Thus the layout of printed circuit boards becomes more fine and complex. And the difficulties to mount and solder components thereon are also enhanced.

In general, the key factor of the yields of mounting assembly parts onto printed circuit boards is the soldering procedure for mounting component leads. Especially when the amounts of leads are increased and the arrangement thereof become highly concentrated, the effective reductions of defects such as bridge, dewetting, blow hole, and etc., can promote the yields of PCBs productions and reduce the failure opportunities of components. In prior art the wave soldering procedures are mainly applied to assembly printed circuit boards for furthering mass productions. And in wave soldering process, the molten solder is driven by a motor pump and forced upward into the through holes beneath the printed circuit boards which are transported obliquely to pass the soldering wave via the transport means.

Please refer to FIG. 1, the current wave soldering system 10 is illustrated. In the wave soldering system 10, a solder bath 12 is applied to contain molten solder, and a motor pump 14 mounted beside the solder bath 12 can swing its fan blades to drive the molten solder. The molten solder gushed upwards from a nozzle 16 disposed in the solder bath 12 forms the rising solder wave. And printed circuit boards 20 can be transferred to pass over the solder bath 12 through inclined transport rails 18. Thus the rising solder wave can fill into the through holes beneath the printed circuit boards to solder the leads of components. It is noted that in the wave soldering procedure the printed circuit board 20 is disposed onto a carrier formed of aluminum alloy or fiberglass wherein the carrier has some hollows for exposing the soldering areas of the printed circuit board. Then the finger 22 chained beneath the transport rails 18 can grab two side of the carrier to transfer the printed circuit board 20 via the transport rails 18.

In general, the printed circuit board 20 is coated flux and preheated first in the front part 24 of the transport rails 18. The flux is applied to clean the surfaces of the soldering metal and to avoid rustiness in atmosphere at high temperature. Besides, the flux is also applied to spread thermal energy uniformly for enhancing the performance of the soldering points. The typical flux coating procedures include foaming type, spraying type, and soaking type. As to the subsequent preheat procedure is applied to dispel the volatility parts of the flux for promoting the temperatures of the printed circuit boards to enhance the flux activity and to prove the capability of filling molten solder into through holes. The typical preheating procedure is to apply infrared tubes beneath the carriers to illuminate the printed circuit boards to a predetermined temperature.

Please refer to FIG. 2, which illustrates the structure of the solder bath 12. The members of solder bath 12 include a nozzle base 26, a nozzle 16 and a motor pump 14. The solder bath 12 for containing molten solder has a horizontal partition 28 applied to divide the inner space of solder bath 12 into two rooms, the upper room and the lower room. And the partition 28 has a bar opening 30 through the upper and lower room on central part thereof. The nozzle base 26 is located on the opening 30, and the nozzle 16 is mounted on the nozzle base 26. Besides, the motor pump 14 disposed beside the solder bath 12 can swing the fan blades to drive molten solder gush from the nozzle 16 in solder bath 12 to form rising solder wave. Thus, when the printed circuit board 20 pass over the molten solder 24 via the inclined transport rails 18, the rising molten solder can fill the through holes beneath the printed circuit board 20 to form solder points.

However, due to the nozzle 16 in prior art is fastened on the nozzle base 26, the outlet direction of nozzle can not be adjusted, and there is no capability of controlling the solder wave of molten solder gushed therefrom. Therefore the yields of soldering process can not be promoted in advance. And the short circuits occurred on the printed circuit boards can not be eliminated as far as possible. So it is required to apply post-sodering procedures by manpower to reduce the defects on printed circuit boards. For solving this issue, associated manufacturing industries devote themselves to improve the structure of solder bath for promoting the soldering yields and throughput thereof effectively.

SUMMARY OF THE INVENTION

A purpose of the present invention is to provide a solder bath with rotatable nozzle to promote yields of soldering procedures.

Another purpose of the present invention is to provide a nozzle with axial pillars stretching horizonally to provide the operator for adjusting the outlet angle of nozzle by rotating it about the axial pillars.

Further a purpose of the present invention is to provide an enclosing frame with axial horizontal pillars for rotating the nozzle.

The present invention discloses a solder bath apparatus applied to the soldering furnace. The solder bath is used for containing molten solder. And a horizontal partition is disposed in the solder bath to divide space therein to an upper room and a lower room. The partition has a bar opening on the center thereof to pass through the lower room and the upper room. A nozzle base is located on the bar opening of the partition to gush molten solder upwards into the upper room. An enclosing frame with a bar-shaped structure is put around the nozzle base, and has axial horizontal pillars mounted on the two terminal sidewalls thereof. The nozzle is manufactured with two bearing pedestals on two terminal sidewalls responsive to the pillars, and is put around the enclosing frame. When the nozzle is put around the enclosing frame, the pillar can penetrate through the bearing pedestal to let nozzle rotate around the pillar for adjusting the direction of nozzle's outlet. Further, an adjusting means is connected with the nozzle to drive the nozzle rotate about the axial pillars.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a new solder bath apparatus for soldering furnace. An extra enclosing frame with two outstanding pillars is provided, and the nozzle is manufactured with two bearing pedestals responsive to the pillars. By putting the nozzle around the enclosing frame, the nozzle can rotate about the pillars by a little angle to adjust the outlet direction of nozzle for promoting the yields of soldering procedures. This invention will be described in further detail by way of example with reference to the accompanying drawings as follows.

Figure 3:
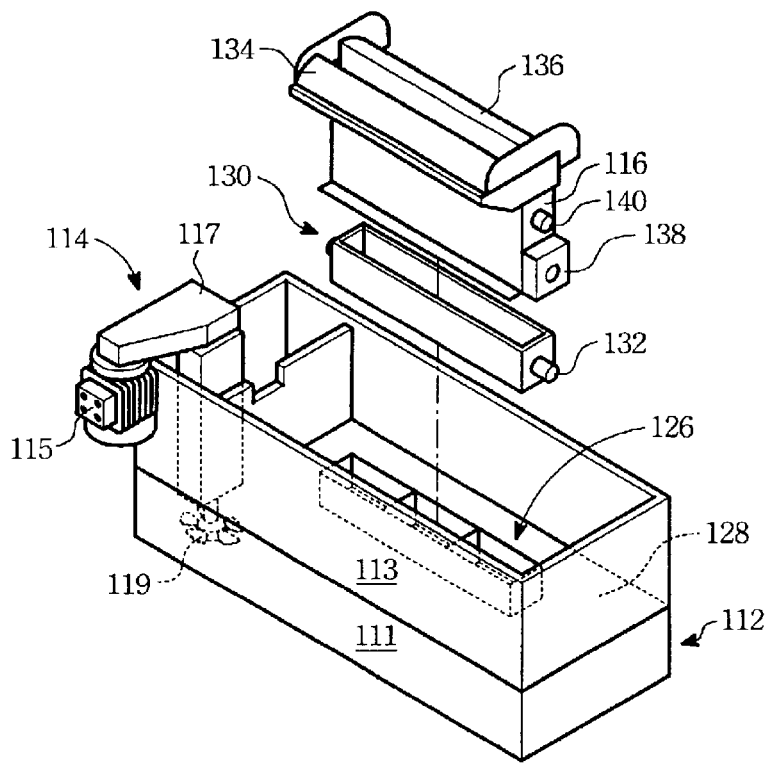
FIG. 3 is an explosive view of the solder bath according to the first embodiment of the present invention.

Please refer to FIG. 3, according to first embodiment of the present invention the structure of solder bath used for soldering furnace is illustrated. The members of solder bath comprise of a solder bath 112, a nozzle base 126, an enclosing frame 130, a nozzle 116 and a motor pump 114. The solder bath 112 applied to contain molten solder has a partition 128 disposed horizontally therein to divide inner space of solder bath 112 into a lower room 111 and an upper room 113. And the partition 128 has a bar opening formed on the center thereof through the lower room 111 and the upper room 113. The nozzle base 126 is located on the bar opening of partition 128 to gush molten solder upwards into upper room 113 when the motor pump 114 is applied to drive molten solder in lower space 111.

It is noted that the enclosing frame 130 with a bar-shaped structure is put around the nozzle base 126 to expose the bar opening thereof. Due to the opening of enclosing frame 130 is equal to that of nozzle base 126, the enclosing frame 130 can be fastened on nozzle base 126. And on the two terminal sidewalls the enclosing frame 130 has axial pillars 132 stretching outwardly as shown in FIG. 3.

Figure 1:
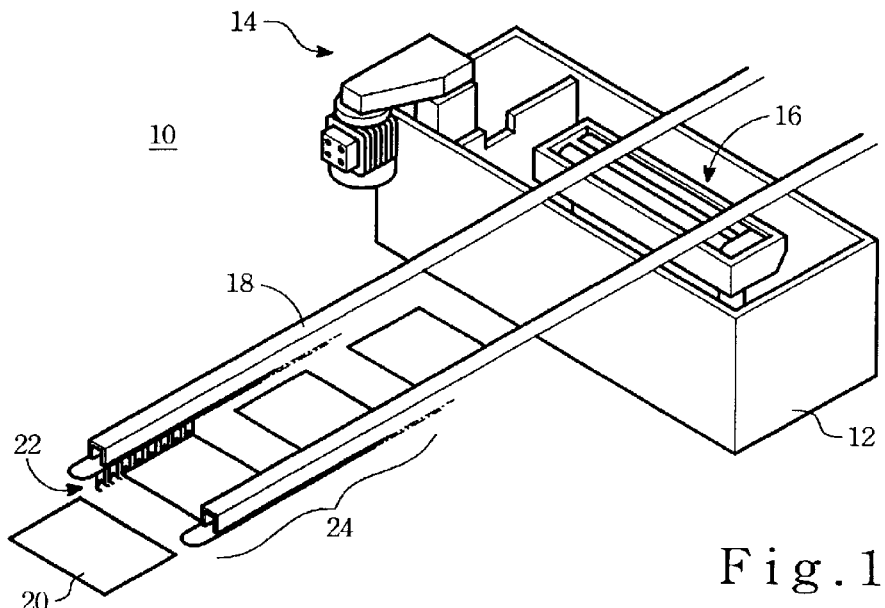
FIG. 1 is a perspective view of the soldering furnace illustrating members for performing the soldering process.
Figure 2:
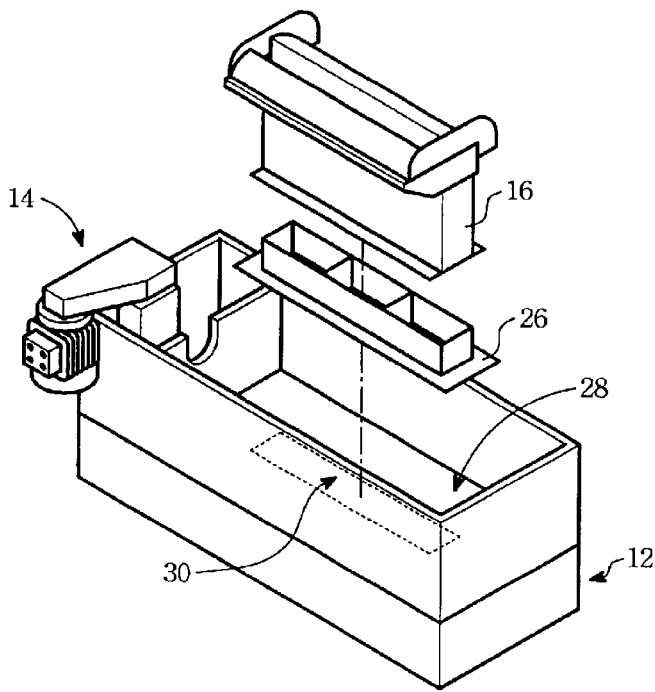
FIG. 2 is a perspective view of the solder bath illustrating members thereof according to prior art.

Likewise, the nozzle 116 is put around the enclosing frame 130 directly. The nozzle 116 has a frontplate 134 and a backplate 136 which constitute the outlet of nozzle 116 to control directions and flow of gushing solder. And two bearing pedestal 138 are respectively jointed with solder on the lower sidewalls of nozzle 116. Each bearing pedestal 138 has a through hole responsive to the pillar 132 on enclosing frame 130. So when the nozzle 116 is put around the enclosing frame 130, the pillar 132 can penetrate through the bearing pedestal 138 to let nozzle 116 rotate around the pillar 132 for adjusting the outlet angle of nozzle 116. Thus, when the printed circuit board is transferred above solder bath 112 via transport rails as shown in FIG. 1, the molten solder gushed from nozzle 116 can fill into the through holes beneath the printed circuit boards to solder leads of components.

Beside solder bath 112 the motor pump 114 is disposed to drive molten solder in lower room 111 of solder bath 112 upwardly into the nozzle 116 through the bar opening on partition 128 and nozzle base 126. The motor pump 114 comprises a motor 115, a drive belt 117 and fan blades 119. The fan blades 119 extending into lower room 111 are driven via drive belt 117 by motor 115 to swing and drive molten solder. The motor 115 as shown in FIG. 3 is hanged on outside of solder bath 112. When the motor 115 swings fan blades 119 via drive belt 117, the molten solder outside of solder bath 112 can be inhaled thereinto and flow through partition 128 to gush from nozzle 116.

Figure 4:
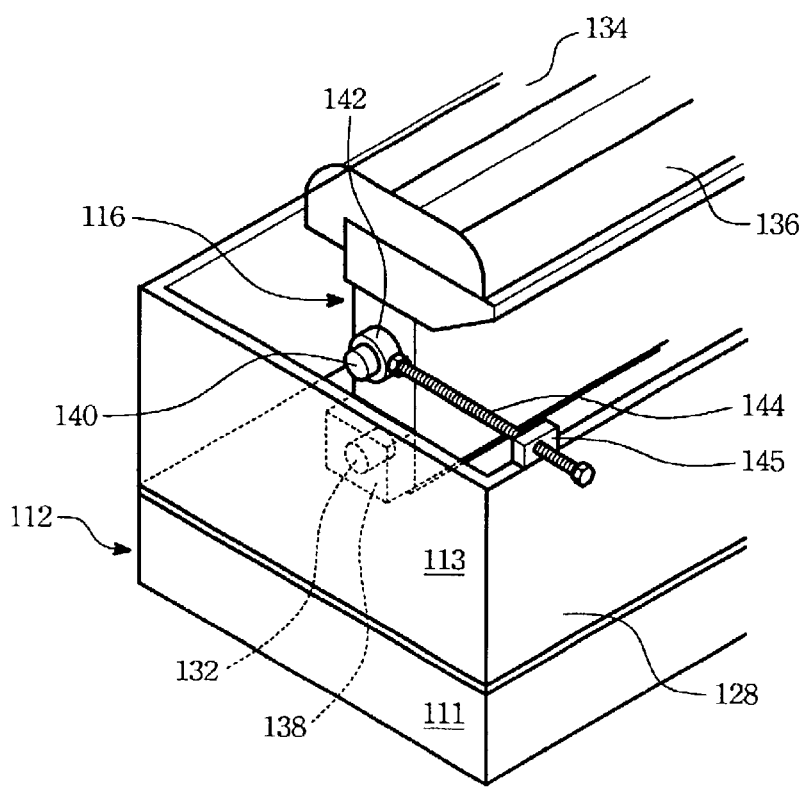
FIG. 4 is a perspective view of the solder bath illustrating connections of associated members according to the first embodiment of the present invention.

For convenience of adjusting the outlet direction of nozzle 116, an adjusting apparatus is provided in the present invention to rotate the nozzle 116 about axial pillars 132. Please refer to FIG. 4, the adjusting apparatus of the present invention is illustrated. Because the sidewall's width of nozzle 116 is a little bit larger than that of enclosing frame 130, there is enough space to rotate nozzle 116 for adjusting the outlet direction. Besides, the nozzle 116 has an adjusting shaft 140 formed on it's sidewall to connect with the adjusting apparatus. In a preferred embodiment, the adjusting apparatus comprises a threaded rod 144 and an enclosing ring 142 which is connected to the front terminal of the threaded rod 144 and is put around the adjusting shaft 140. Further, a fixing stand 145 is mounted on top surface of a wall of solder bath 112, which has a spiral hole to let the threaded rod 144 penetrate and screw through. Therefore the threaded rod 144 can be screwed clockwise into solder bath 112 or counter-clockwise out of solder bath 112.

When threaded rod 144 is screwed into solder bath 112, the enclosing ring 142 can push adjusting shaft 140 to rotate nozzle 116 in a forward direction about the pillars 132. On the contrary, when threaded rod 144 is screwed out of solder bath 112, the enclosing ring 142 can pull adjusting shaft 140 to rotate nozzle 116 in a reverse direction about the pillars 132. Thus, by screwing threaded rod 144 into/out of solder bath 112, nozzle 116 can rotate in the forward of reverse directions to adjust the outlet direction of nozzle 116 for controlling the solder flow gushed from nozzle 116.

Figure 5:
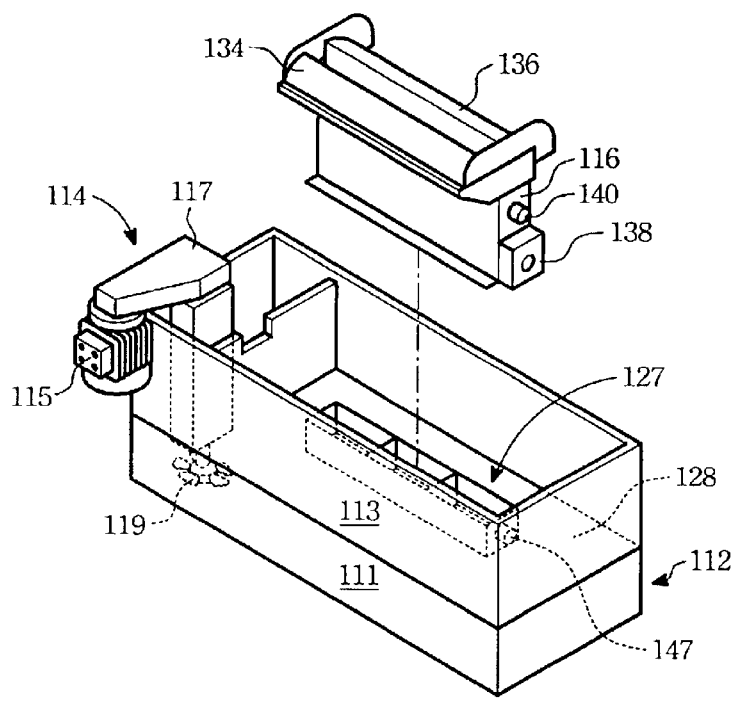
FIG. 5 is an explosive view of the solder bath according to the second embodiment of the present invention.
Figure 6:
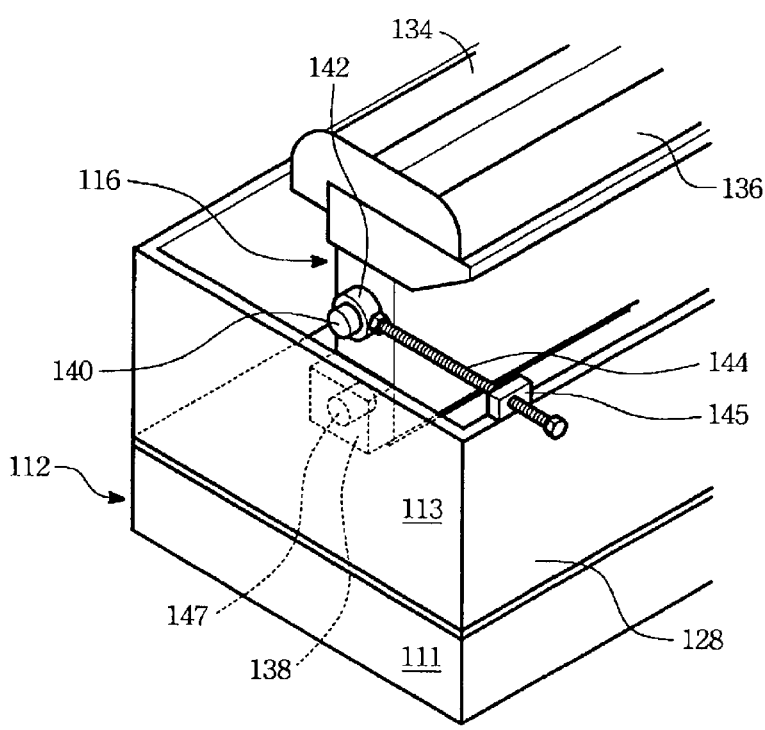
FIG. 6 is a perspective view of the solder bath illustrating connections of associated members according to the second embodiment of the present invention.

It is noted that the enclosing frame 130 disclosed above is an optional member, and the nozzle 116 can be disposed on the nozzle base 126 directly. Please refer to FIG. 5, the associated members of solder bath 112 without the enclosing frame 130 according to the second embodiment of the present invention is illustrated. Especially the nozzle base 127 herein is manufactured with two pillars 147 formed on two terminal sidewalls thereof and stretching horizontally outwardly. Thus, when nozzle 116 is put around nozzle base 127, the pillar 147 can penetrate through the bearing pedestal 138 of nozzle 116 as shown in FIG. 6.

Likewise, by screwing threaded rod 144 into solder bath 112 the enclosing ring 142 can push adjusting shaft 140 to rotate nozzle 116 in the forward direction about the pillars 147 on nozzle base 127. On the contrary, by screwing threaded rod 144 out of solder bath 112 the enclosing ring 142 can pull adjusting shaft 140 to rotate nozzle 116 in the reverse direction around the pillars 147 on nozzle 116. Thus, by screwing threaded rod 144 clockwise or counter-clockwise the outlet of nozzle 116 can rotate to adjust molten solder flow.

Figure 7:
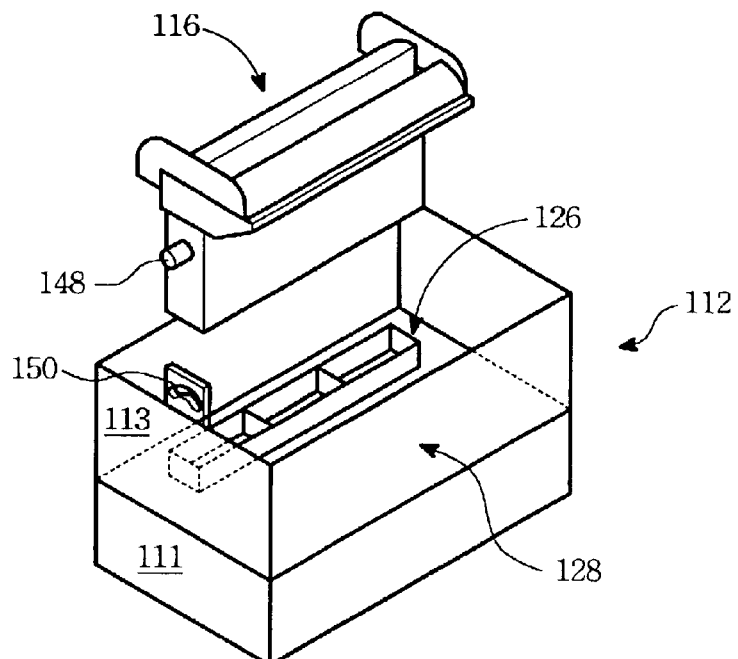
FIG. 7 is an explosive view of the solder bath according to the third embodiment of the present invention.

Besides, the present invention also provides another structure for rotating the nozzle 116. Please refer to FIG. 7, according to the third embodiment of the present invention two bearing pedestal 150 are mounted on top edge of the two sidewalls of solder bath 112. And each bearing pedestal 150 has a through hole. In a preferred embodiment, the through hole of bearing pedestal 150 is manufactured with an arc opening to allow the nozzle 116 rotating in the front direction or in the reverse direction. On the other hand, the nozzle 116 has two pillars 148 mounted on two terminal sidewalls thereof responsive to the through holes of bearing pedestal 150.

Figure 8:
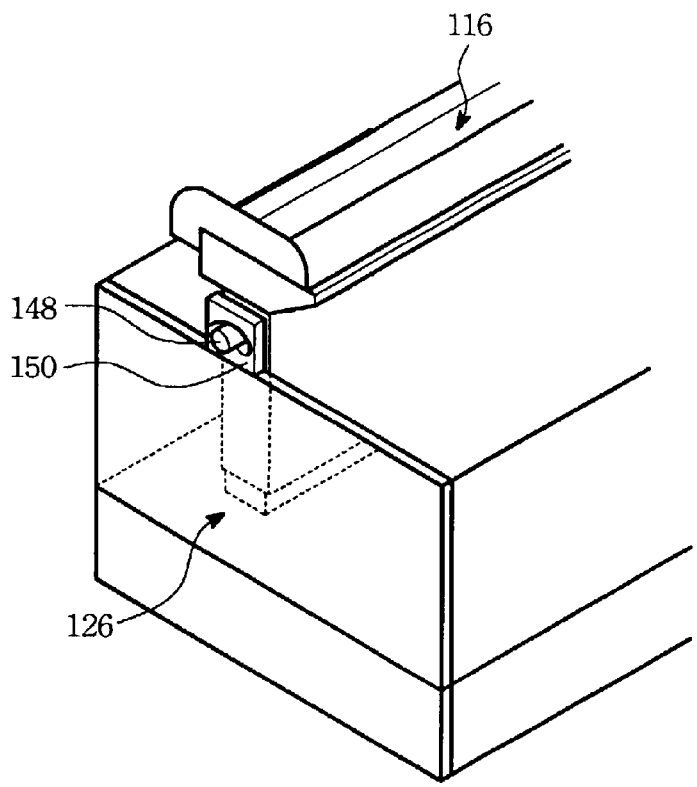
FIG. 8 is a perspective view of the solder bath illustrating connections of associated members according to the third embodiment of the present invention.

Referring to FIG. 8, when nozzle 116 is put around the nozzle base 126, the pillar 148 can penetrate through the bearing pedestal 150. Thus, by rotating the pillar 148 the operator can control the outlet direction of nozzle 116 for adjusting the gushing molten solder flow. Likewise, in the manufacture of the associated members, the width of sidewalls of nozzle 116 is little larger than that of nozzle base 126 for providing the nozzle 116 enough space to rotate.

The present invention has many advantages as follows:

(1) The nozzle base is manufactured to have horizontal pillars mounted on two terminal sidewalls thereof, and the nozzle is manufactured with bearing pedestals responsive to the pillars. So when the nozzle is put around the nozzle base, the pillar can penetrate through the bearing pedestal. And the nozzle is rotatable around the axial pillar. Thus the operator can rotate the nozzle to further control the flow of gushing molten solder for promoting yields thereof;

(2) when the enclosing frame is introduced, the pillars can be mounted directly on enclosing frame but nozzle base. So for the industry they just need to manufacture the enclosing frame according to the opening size of nozzle base, and put it around the nozzle base directly. After disposing the nozzle with bearing pedestals on the nozzle base, the operator can have the convenience of rotating the nozzle for adjusting solder flow. Comparatively, it is not necessary to drain off all molten solder in the solder bath for disassembling the partition to mount pillars onto the nozzle base.

While the preferred embodiment of the invention has been illustrated and described, it will be appreciated that various changes can be made therein without departing from the spirit and scope of the invention.

What is claimed:

1. A solder bath apparatus comprises of:
   a solder bath for containing molten solder;
   a nozzle base located in said solder bath with a bar opening to let molten solder flow therethrough upwardly;
   an enclosing frame put around said nozzle base and exposing said bar opening, wherein said enclosing frame has outstanding axial pillars mounted on sidewalls thereof;
   a nozzle put around said enclosing frame being able to rotate about said axial pillars to adjust an outlet direction of said nozzle, wherein said nozzle has bearing pedestals mounted on sidewalls thereof being responsive and connected with said pillars to let said nozzle rotate.

2. The solder bath apparatus of claim 1, wherein a width of said sidewall of said nozzle is large than that of said enclosing frame to let said nozzle have enough space to rotate about said axial pillars.

3. The solder bath apparatus of claim 1, wherein said nozzle has an adjusting shaft disposed on said sidewall of said nozzle, and said adjusting shaft is connected to an adjusting means for driving said nozzle to rotate about said axial pillars, wherein said adjusting means comprises of:
   a threaded rod disposed on said solder bath being able to screw into/out of said solder bath; and
   an enclosing ring connected to a front terminal of said threaded rod, wherein said enclosing ring is put around said adjusting shaft.

4. The solder bath apparatus of claim 3, wherein said solder bath has a fixing stand mounted on a top edge of a wall of said solder bath, wherein said fixing stand has a spiral hole to let said threaded rod screw therethrough into/out of said solder bath.

5. The solder bath apparatus of claim 3, when said threaded rod is screwed into said solder bath, said enclosing ring can push said adjusting shaft to rotate said nozzle in a forward direction, and when said threaded rod is screwed out of said solder bath, said enclosing ring can pull said adjusting shaft to rotate said nozzle in a reverse direction.

6. A solder bath apparatus comprises of:
   a solder bath for containing molten solder;
   a nozzle base located in said solder bath with a bar opening to let molten solder flow therethrough upwardly, wherein said nozzle base has outstanding axial pillars mounted on sidewalls thereof;
   a nozzle put around a enclosing frame and being capable of rotating about said axial pillars to adjust an outlet direction of said nozzle, wherein said nozzle has bearing pedestals mounted on sidewalls thereof being responsive and connected with said pillars to let said nozzle rotate.

7. The solder bath apparatus of claim 6, wherein a width of said sidewall of said nozzle is large than that of said enclosing frame to let said nozzle have enough space to rotate about said axial pillars.

8. The solder bath apparatus of claim 6, wherein said nozzle has an adjusting shaft disposed on said sidewall of said nozzle, and said adjusting shaft is connected to an adjusting means for driving said nozzle to rotate about said axial pillars, wherein said adjusting means comprises of:
   a threaded rod disposed on said solder bath being able to screw into/out of said solder bath; and
   an enclosing ring connected to a front terminal of said threaded rod, wherein said enclosing ring is put around said adjusting shaft.

9. The solder bath apparatus of claim 8, wherein said solder bath has a fixing stand mounted on a top edge of a wall of said solder bath, wherein said fixing stand has a spiral hole to let said threaded rod screw therethrough into/out of said solder bath.

10. The solder bath apparatus of claim 8, when said threaded rod is screwed into said solder bath, said enclosing ring can push said adjusting shaft to rotate said nozzle in a forward direction, and when said threaded rod is screwed out of said solder bath, said enclosing ring can pull said adjusting shaft to rotate said nozzle in a reverse direction.

11. A solder bath apparatus applied to a soldering furnace comprises of:
   a solder bath for containing molten solder having bearing pedestals mounted on top edges thereof, and each said bearing pedestal has a through hole;

a partition disposed in said solder bath to divide space thereof to a lower room and a upper room having at least one bar opening to pass through said lower room and said upper room;

a nozzle base mounted on said partition and exposing said bar opening;

a nozzle put around said nozzle base, wherein said nozzle has pillars mounted thereon for penetrating said through holes of said bearing pedestals individually to let said nozzle be rotatable about said axial pillars; and a motor pump disposed inside said solder bath for driving molten solder in said lower room flow upwardly into said nozzle via said partition.

12. The solder bath apparatus of claim 11, wherein a width of a sidewall of said nozzle is large than that of said nozzle base to let said nozzle have enough space for rotating with a little angle.

13. The solder bath apparatus of claim 11, wherein said nozzle has an adjusting shaft disposed on said sidewall of said nozzle, and said adjusting shaft is over said pillars.

14. The solder bath apparatus of claim 13, further comprises an adjusting means connected to said adjusting shaft for driving said nozzle to rotate about said axial pillars, wherein said adjusting means comprises of:

a threaded rod disposed on said solder bath being able to screw into/out of said solder bath; and an enclosing ring connected to a front terminal of said threaded rod, wherein said enclosing ring is put around said adjusting shaft.

15. The solder bath apparatus of claim 14, wherein said solder bath has a fixing stand mounted on a top edge of a wall of said solder bath, wherein said fixing stand has a spiral hole to let said threaded rod screw therethrough into/out of said solder bath.

16. The solder bath apparatus of claim 14, when said threaded rod is screwed into said solder bath, said enclosing ring can push said adjusting shaft to rotate said nozzle in a forward direction, and when said threaded rod is screwed out of said solder bath, said enclosing ring can pull said adjusting shaft to rotate said nozzle in a reverse direction.

\* \* \* \* \*